United States Patent Office 3,492,223
Patented Jan. 27, 1970

3,492,223
PHENOLIC COMPLEXES
Wilhelm E. Walles, Midland, Mich., assignor to The Dow Chemical Company, Midland, Mich., a corporation of Delaware
No Drawing. Application Aug. 25, 1964, Ser. No. 392,015, now Patent No. 3,382,244, dated May 7, 1968, which is a continuation-in-part of application Ser. No. 40,536, July 5, 1960. Divided and this application Mar. 14, 1968, Ser. No. 803,490
Int. Cl. C02b 1/16
U.S. Cl. 210—24                                 1 Claim

ABSTRACT OF THE DISCLOSURE

A hydroxyl-bearing aromatic substance, that is, a phenolic substance generally, is removed from water in which it is dispersed by contacting the water bearing such compound with an insoluble polymer comprising recurring morpholinone moieties.

REFERENCE TO RELATED APPLICATIONS

The instant application is divided from application Ser. No. 392,015, filed Aug. 25, 1964, now Patent No. 3,382,-244. That application, in its turn was a continuation-in-part of application Ser. No. 40,536, filed July 5, 1960, now abandoned.

SUMMARY OF THE INVENTION

The present invention is concerned with phenolic complexes, and is more particularly concerned with complexes of which one member is a phenolic compound of the sort hereinbelow set forth and generically described as a complectate and the other, informally thought of as being the active agent, and called the complectant, in the formation of the complex, is a morpholinone compound.

By the expression "morpholinone compound" there is intended to be designated a member of the group consisting of morpholin-3-one, loweralkyl morpholin-3-one, loweralkenyl morpholin-3-one, loweralkenylloweralkyl morpholin-3-one, loweralkylidene bis(morpholin-3-one), the addition polymers of such lower alkenyl morpholinones, and their addition copolymers with ethenically unsaturated copolymerizable substances, including polymeric 4-vinylmorpholin-3-one, and a co-polymer of 4-vinylmorpholin-3-one with one of 1,3-butadiene, 2,3-dimethyl-1,3-butadiene, isoprene, styrene, p-methoxystyrene, p-carboxystyrene and divinylbenzene.

The unpolymerized morpholinone devoid of polymerizable substituents functions effectively as a complectant in the present invention, so do high polymers of polymerizable materials. It follows that the degree of polymerization and related molecular weight of polymers are not critical.

A complectate to be employed according to the present invention is a compound which contains an aromatic nucleus, and a hydroxyl or sulfhydryl substituent upon the said nucleus, optionally with certain further substituents, such compound being herein generically termed arylhydrolowerchalkogenides. This term is used throughout the present specification and claims to designate a member of the group consisting of phenol, thiophenol, naphthol and thionaphthol and the substituted derivatives thereof.

The substituted arylhydrolowerchalkogenides to be used in the present invention can bear, as ring substituents, from one to four members of the group consisting of hydroxy, alkyl, alkenyl, cyclohexyl, loweralkoxy, formyl, carboxyl, phenyl, alkyl(hydroxyphenyl), alkyl (halohydroxyphenyl), hydroxyphenyl, chloro, bromo, iodo, amino, alkyl((phenyl)hydroxyphenyl), and the polyepicyclic groups characteristic of estrone, estradiol, estriol, equilenin, stilbestrol, hexestrol and thelephoric acid.

Representative such compounds include phenol, thiophenol, o-cresol, m-cresol, p-cresol, 2,3-dimethylphenol, 2,4-dimethylthiophenol, 2,5-dimethylphenol, 2,6-dimethylphenol, 3,4-dimethylphenol, 3,5-dimethylphenol, o-ethylphenol, m-ethylphenol, p-ethylphenol, 2,4,5-trimethylphenol, 2,4,6-trimethylphenol, 4-indanol, o-n-propylphenol, m-n-propylphenol, p-n-propylphenol, 2,3,5,6-tetramethylphenol, o-n-butylphenol, m-n-butylphenol, p-n-butylphenol, p-sec-butylphenol, p-n-amylphenol, carvacrol, thymol, o-allylphenol, p-allylphenol, p-propenylphenol, p-stearylphenol, 2,4-dimethyl-6-tert-butylphenol, o-cyclohexylphenol, m-phenylphenol, p,p'-dihydroxydiphenyl-methane, 2,2'-dihydroxybiphenyl, 2,4'-dihydroxybiphenyl, 3,3'-dihydroxybiphenyl, 4,4'-dihydroxybiphenyl, 1-naphthol, 2-naphthol, pyrocatechol, resorcinol, hydroquinone, pyrogallol, 1,2,3-benzenetriol, phloroglucinol, m-chlorophenol, p-bromophenol, o-iodophenol, 2,4,6-tribromophenol, o-nitrophenol, o-aminophenol, m-aminophenol, p-aminophenol, 2,5-diaminophenol, 1,3-dihydroxy - 4 - hexylbenzene, 3-pentadecylcatechol, 1,2-dihydroxy - 3 - (pentadecenyl - 8')benzene, 1,2-dihydroxy-3-(pentadecadienyl-8',11')benzene, 1,2-dihydroxy-3-(pentadecatrienyl-8',11',14')benzene, 2,2'-methylene-bis-2,4,6-trichlorophenol, 2,2'-thiobis-4,6-dichlorophenol, 2,4,5-trichlorophenol, 2,2-di(4-hydroxyphenyl)propane, p,p'-sec-butylidenediphenol, 4,4'-isopropylidenedi - o - cresol, 4,4' - isopropylidenebis(2 - phenyl)phenol; p,p' - (1,3-dimethylbutylidene)diphenol, p,p'-cyclohexylidenediphenol, 4,4'-isopropylidenebis(2-isopropyl)phenol, p,p'-sulfonyldiphenol, 2,2' - methylene bis(3 - chlorophenol), 2,2'-methylenebis(3,4-dichlorophenol), 2,2' - methylenebis-(3,5-dichlorophenol), 2,2' - methylenebis(3,6-dichlorophenol), 2,2'-methylenebis(3,4,5-trichlorophenol), 2,2'-methylenebis(3,5,6-trichlorophenol), 2,2' - methylenebis-(3,4,5,6-tetrachlorophenol), 2,2' - methylenebis(3,4,6-tribromophenol), and 2,2' - methylenebis(3,4,6 - trichlorophenol), estrone, estradiol, estriol, equilenin, stilbestrol, hexestrol, 3,6-dihydroxy-2,5-diphenylquinone, 3,6-dihydroxy-2,5-di(4-hydroxyphenyl) quinone, thelephoric acid, salicyclic acid, 5-chlorosalicyclic acid, 3,5-dichlorosalicyclic acid, phenylsalicyclic acid, guaiacol, salicyl alcohol, gallic acid, and protocatechuic acid.

The properties of the hydroxyaromatic and sulfhydryl aromatic complexes of the instant invention differ from the sum of the properties of the starting materials in that such complex derives its physical properties primarily from the complectant member, and its chemical and particularly biochemical properties primarily from the complectate member. Thus, for example, a complex of phenol tends to assume the vapor pressure, solubility in various solvents, and physical state characteristic of the complectant whereas such complex largely retains the chemical and in particular the biochemical, such as the germicidal, properties of phenol. The complex exhibits very little of the vesicant and escharotic action of phenol upon animal tissues.

The complexes of the present invention will be better understood by reference to the following examples.

Example 1.—Complex of morpholin-3-one with phenol

Various complexes of morpholin-3-one and phenol are prepared. The complexes differ in the ratio of complectant to complectate. In a first preparation, an aqueous solution containing 9.41 grams of phenol is added, with mixing and stirring, to a second aqueous solution containing 11.51 grams morpholin-3-one. The resulting solution gives almost no odor of phenol. Upon drum drying there is obtained a solid, nearly white, dry, non-crystalline complex of morpholin-3-one and phenol. Infrared spectra of the resulting preparation give no clear evidence of the presence of uncombined phenol and clearly indicate the presence of a complex.

A complex is prepared in all respects similar to the foregoing except that ½ the amount of the complectant is employed. The preparation is examined by infrared spectroscopy. The spectrum of the resulting preparation indicates the presence of uncomplected phenol, and a complex of morpholin-3-one and phenol. The employment of excess complectate results in the preparation of a complex which is impure by reason of uncombined complectate. The preparation has the characteristic odor of phenol, and is moderately hygroscopic.

A complex in all respects similar to the first foregoing complex of the present example is prepared except that one-half the stated amount of phenol is employed. The odor of phenol is greatly diminished with the preparation of a colorless solution comprising a complex of phenol with uncomplected morpholinone material. Infrared examination of the resulting preparation indicates the presence of both the said complex and the said uncomplected morpholinone material.

Example 2.—Complex of 4-ethylmorpholin-3-one and phenol

In the present example the complectant is the compound 4-ethylmorpholin-3-one. The complectate is phenol. Phenol (9.4 grams) is melted: into the melted phenol is stirred 11 grams 4-ethylmorpholin-3-one. In the resulting mixture the odor of phenol disappears and there is formed a complex of the said members.

The infrared spectrum of the resulting complex indicates significant shifts in the positions of peaks indicating the carbonyl group of the morpholinone ring.

The complex prepared according to the present example is readily dissolved in water and various organic solvents, and is strongly germicidal.

Example 3.—Complex of polymeric 4-vinylmorpholin-3-one and phenol

In the present example the complectant is a polymer each of whose recurring units is derived from the monomer 4-vinylmorpholin-3-one. The average molecular weight of the polymer is represented by the K-value according to Fikentscher of 27. The complectant polymer is a bland, water-soluble flaky, innocuous solid, hyaline as a continuous solid and yellow-white in granular mass. Its water solutions are relatively viscous.

To a water solution containing 10 percent of the said complectant by weight of resulting solution is added, as complectate, an equal amount of a similar 10 weight percent solution of phenol. Each starting material is readily and completely water soluble. The phenol solution is added to the complectant solution all at once, with stirring. There is promptly formed a white, water-slurried semi-soluble solid complex. Upon further stirring the solid component of the slurry tends to conglomerate to form a coherent mass. Thereafter, the complection mixture is filtered to separate the solid complex product, which is found to be a hygroscopic cohesive nearly odorless solid which is deformed readily under pressure. Removal of bound water to obtain a palpably dry product is not readily accomplished.

The liquid filtrate from which the insoluble complex product is removed is found, upon analysis, to contain a second complex composed of the same members as the first but with a lower relative content of phenol: the second complex is water-soluble, and is isolated in moist form by evaporation of solvent water.

A second such preparation is carried out and the resulting dispersion promptly passed onto a drum drier of which the drum is heated at 170° C. As a result of these operations there is obtained a dry, nearly odorless solid complex of the said components.

The drum-dried complex is studied in detail. It is determined by infrared spectrum analysis that it contains no free phenol, yielding a spectrum the relevant portions of which indicate a structure intermediate that of free phenol and the phenate ion.

Upon prolonged exposure to atmosphere containing not less than 60 percent relative humidity the insoluble complex attracts moisture and tends to dissolve. The complex is practically odorless, indicating a practically complete suppression of vapor pressure of phenol.

The modification in germicidal properties manifest by the present complexes when compared with phenol is evidenced by the results obtained in the following test, known as the agar cup test. Nutrient agar plates of approximately 50 millimeters diameter and a few millimeters depth are prepared and inoculated by swabbing the surfaces thereof with a fresh broth culture of a test microorganism. Through the inoculated surface in approximately the center of the plate, a recess of approximately 12 millimeters diameter is cut and the recess filled with the test compound, using approximately 0.1 gram of chemical substance to be tested. The resulting prepared plate is then incubated for three days under optimum conditions of temperature and humidity to encourage growth of the microorganism. The plates are therefore examined for evidence of development, around the recess, of a zone wherein growth of the microorganism is inhibited. Numerous complexes and compounds are thus tested. Check plates are similarly prepared and treated but without introduction, to the cut recess, of any chemical substance. In such test, phenol uniformly produces a zone of inhibition of from 15 to 20 millimeters radius, the limit of the agar plate. The complexes of the foregoing examples also give inhibition in a reduced zone of varying radius, usually less than half the radius of the agar plate. Within this zone, the microorganisms are completely inhibited, but such inhibiting action is confined to the said reduced zone. The results of the said test are essentially uniform and consistent when applied to the pathogenic bacteria *Staphylococcus aureus* and *Salmonella typhosa* as well as to the fungi, *Penicillium digitatum* and *Aspergillus niger*. Thus it is evident that the complex according to Example 1 exhibits a bacteriostatic and fungistatic action comparable with that of the phenol starting material but more readily restricted in distribution in an essentially aqueous, semisolid medium. The complex is thus better adapted than the phenol starting material to be applied germicidally in defined areas for many surficial and topical applications. It is, moreover less irritating and less odorous.

The procedures of the present invention lead to a process useful in the waste-disposal and related chemical arts. As will be clearly apparent from the teaching hereinbefore, an insoluble complectant which may be a cross-linked copolymeric complectant sub-divided, as by grinding or tabletting to any desired degree of particulate subdivision, may be employed as an absorption bed. Waste fluids such as waste waters or gases carrying phenolic, cresylic, and like aromatic hydroxyl-bearing substances, may be caused to pass through such bed, with the result that the phenolic substances become complected and bound with the insoluble complectate and thus removed from the fluid waste. By regulation of bed-depth, particle size, and other factors it is possible to effect removal, to any desirable degree, of phenolic wastes from such fluid waste-bearing effluents. Following such treatment which is regarded as a form of the well-known procedure of "scrubbing," the scrubbed fluid may thereafter be disposed of in known ways. After sufficient use, the complectant substance becomes exhausted as to capacity to form a complex according to the present invention. In such instance, the satisfied complex may be extracted with an organic solvent, as, for example, methylene chloride, whereby to strip off phenolic complectate and regenerate the capacity of the complectant to scrub further waste.

The thus released complectate may, if desired, be recovered from the resulting solvent solution and thereafter employed in any suitable manner.

A further beneficial practice which the present invention makes possible is the employment of phenol in the decontamination of water known to contain or suspected of containing living organisms deleterious in drinking water. In this embodiment, phenol is added to such contaminated water in an amount sufficient to destroy pathogenic microorganisms. Upon completion of the destruction of the microorganisms, the water may be passed through one or a succession of filtration beds comprising an insoluble complectant according to the present invention, whereby the phenol may be complected, bound, and removed quantitatively from the water. The resulting purified water may then be used in any way in which water of the same general properties and containing no living microorganisms is to be employed. Phenolic germicidal complectate agents other than phenol having a similarly useful action may also be employed.

I claim:
1. Method of removing an aromatic hydroxy-bearing substance from water containing the same, which comprises the step of passing said water through a filtration bed comprising particles of water-insoluble polymer which polymer comprises recurring morpholin-3-one nuclei.

References Cited

UNITED STATES PATENTS

| | | | |
|---|---|---|---|
| 2,812,305 | 11/1957 | Manka | 210—21 |
| 2,930,753 | 3/1960 | McMahon | 210—21 |
| 3,382,244 | 5/1968 | Walles | 260—247.2 |

SAMIH N. ZAHARNA, Primary Examiner

U.S. Cl. X.R.
210—59; 260—247.2